Dec. 11, 1934.  F. G. SCHWALBE  1,983,816
HEAT RETAINING FLOAT FOR GLASS TANK FEEDING SHELVES
Filed Sept. 12, 1933  2 Sheets-Sheet 2
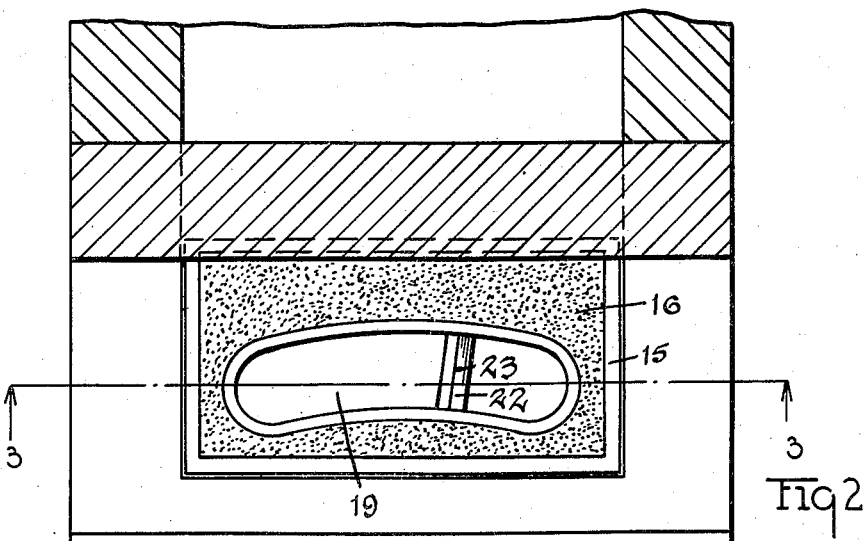
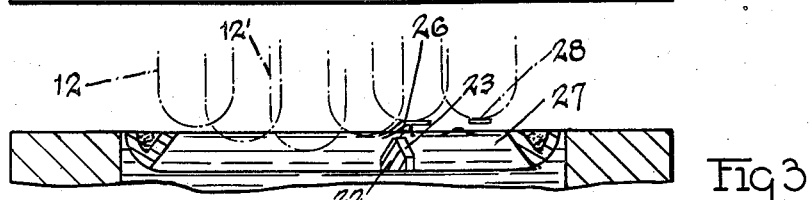
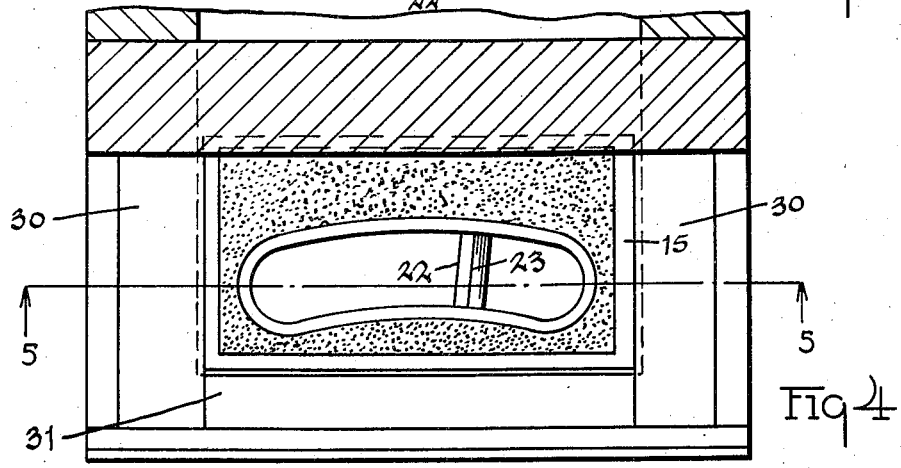
Inventor
Franz G. Schwalbe
By Faust & Crampton.
Attorney Patented Dec. 11, 1934

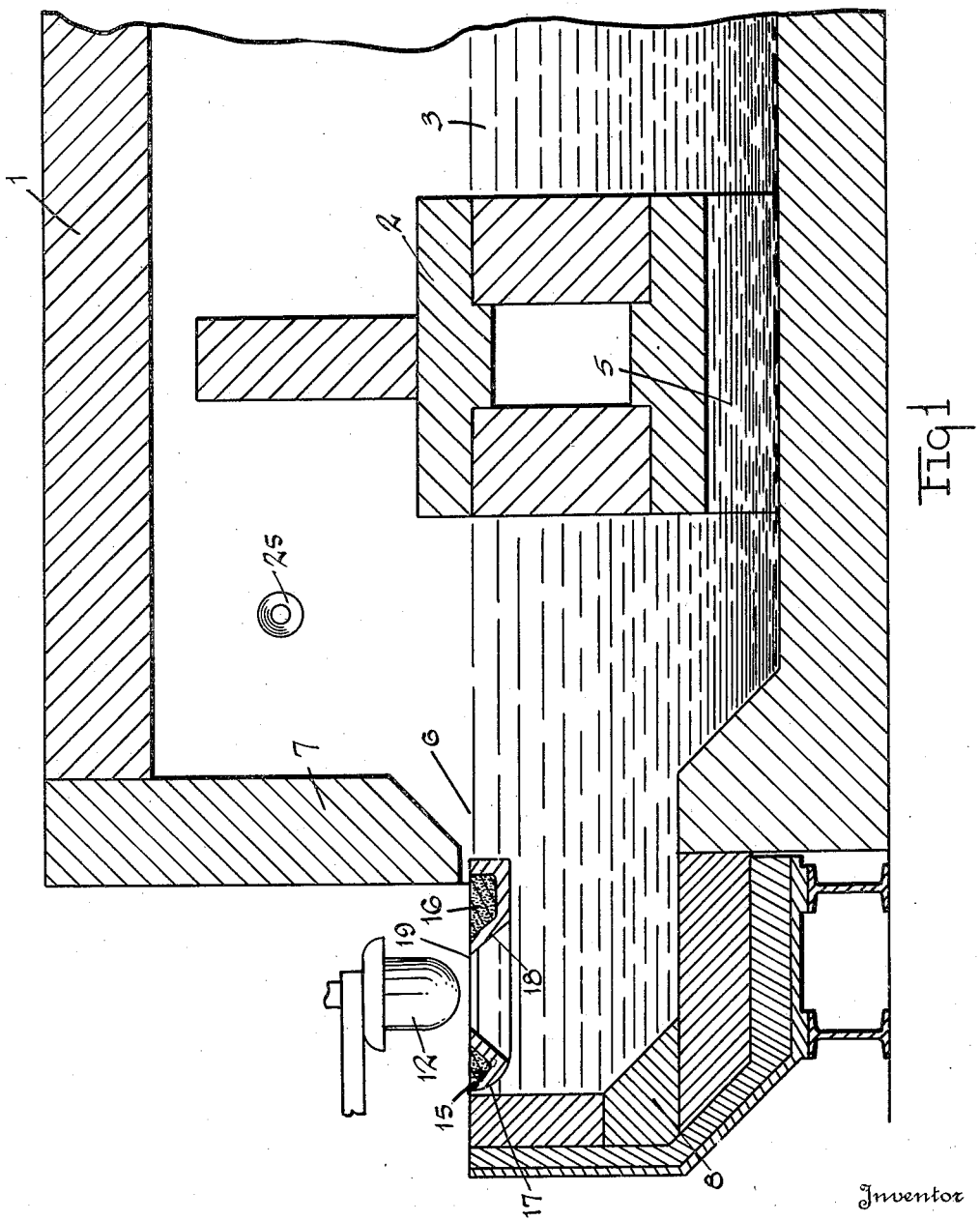

1,983,816

UNITED STATES PATENT OFFICE 1,983,816

HEAT RETAINING FLOAT FOR GLASS TANK FEEDING SHELVES

Franz G. Schwalbe, Toledo, Ohio

Application September 12, 1933, Serial No. 689,112

4 Claims. (Cl. 49—56)

My invention has for its object for maintaining the glass of glass tank delivery shelves at a uniform high temperature to produce uniform high quality shaped glass. The invention is particularly advantageous when used in connection with gathering means, such as well known automatic blowing or shaping machines, and wherein the shelves are so designed as to enable the location of one or more machines in working juxtaposition with glass tanks to withdraw molten glass from the tank. In connection with such tanks ordinarily, the shelves are necessarily shallow and protrude considerably from the tank body to enable dipping and gathering of glass by the molds or other glass gathering device. The glass is usually drawn into the molds or gathering containers by suction. By reason of the necessary shallowness or lack of depth of the glass within the shelves, and by reason of the projection of the shelves from the tank body, the heat of the glass radiates readily therefrom causing cooling of the glass and, furthermore, the exposure of the surface of the glass within the shelf to outside atmosphere, in the form of constructions heretofore used, causes, in like manner, radiation of heat and chilling of the glass. This causes the gathering of glass having different consistency or viscosity into the molds or gathering containers which produces a variation in character of the glass located in different parts of the articles formed therefrom and consequently the production of unsightly glass having irregular contraction that produces distortion.

By my invention I provide a refractory heat insulating floatable member of a character similar to that of a wall of the tank itself and located on the surface of the glass in the shelf and so as to completely cover the glass in the shelf except for an arcuate shaped opening described by the gathering molds of the automatic forming machines, the openings being so formed as to enable the glass gathering molds to dip below the surface of the glass gathering the glass as they swing along the shelf. The refractory member is so formed as to float on the surface of the glass and consequently completely closes the shelf except that portion formed by the arcuate opening into which the glass gathering mold dips. The edges of the float substantially fit the shelf edge and consequently it substantially seals the interior of the shelf as against the radiation of any heat from the glass body and prevents or greatly reduces cooling of the glass within the shelf at the surface that would otherwise produce lack of uniformity in the character of the articles produced from the glass drawn from the shelf. Owing to the fact that the gathering molds or other containers ordinarily gather both the cooler and the hotter glass, there is produced in the finally formed glass article glass having irregular refractive characteristics as well as irregular strains that often render parts of the article fragile, while by my invention the glass gathered has substantially uniform temperature which maintains uniform viscosity and consequently produces a far more perfect glass article.

The heat insulating block being floated in the glass on the shelf operates to maintain a uniform working condition of the glass notwithstanding the change of the level of the glass in the tank as it is used up in forming the articles. The float forms a guide for the setting of the machine to produce uniform depth of dipping below the glass surface. It also operates in conjunction with the moving gathering molds or containers to circulate the glass through the opening in the floatable heat insulator with great effectiveness by reason of the narrow width of the opening which is substantially that of the gathering mold itself, the gathering mold operating to push the glass along the opening, the glass within the opening being at all times confined by reason of the fact that the block floats and maintains its position below and above the glass surface. Hence, upon the entrance or movement of each mold into and along the opening there is produced a complete removal of the surface glass.

The invention also provides means for maintaining the cut-off glass in a part of the shelf other than that into which the molds are dipped. The cut-off glass gathers in this part and of course settles into the glass and eventually is heated by the glass of the furnace until it has the consistency of the body of the glass of the shelf.

The invention has for its object to produce glass shelf heat insulators of different forms and to illustrate a practical application of the invention. I have selected an insulator and two forms of shelf structures that contain the invention as an example of such structures and shall describe these particular structures hereinafter. The floatable insulator member having the glass delivering port and the glass delivering shelves with which it may be associated, is shown in the accompanying drawings.

Fig. 1 is a view of a section of a part of the furnace, the shelf, and the floatable block. Fig. 2 illustrates a top view of the shelf shown in Fig. 1. Fig. 3 is a broken view of a section taken on the plane of the line 3—3, and also illustrates diagrammatically the progressive positions of the gathering mold as it moves over and dips into the glass of the glass shelf. Fig. 4 illustrates the heat insulating block located within the shelf and having a structure that slightly differs from the structure of the shelf shown in Figs. 1 and 2, and illustrates a means for preventing heat radiation from the glass along the outer edges of the heat insulating float. Fig. 5 illustrates a broken view of a section taken on the plane of the line 5—5 indicated in Fig. 4.

As shown in the drawings, the tank 1 is provided with the usual bridge wall 2 underneath which the glass 3 flows through the port 5, in the manner well known in the art. The tank 1 has one or more openings in the side wall 7, such as indicated at 6, and the delivering shelf 8 protrudes from the lower edge of each opening 6 to form an extension of the interior of the tank in the form of a bay for disposing portions of the glass in position such that it may be gathered by the automatic glass forming machines. The upper edge of the opening 6 is located slightly above the normal glass level and the upper edge of the shelf or bay extends to a point slightly above the glass level and, hence, the glass flows into the shell and is located in position so as to deliver the glass to the glass gathering containers or molds of a rotary machine that progressively dip as they pass over each projecting shelf. A plurality of the glass molds 12 are connected to suitable arms of the glass forming machine, in the manner well known in the art. The arms swing over the top of the shelf, the machines being provided with means for causing the descent of the arms and the glass molds as they successively pass over the shelves.

Owing to the fact that a large volume of the glass must be accumulated in the shelf in order to provide for a sufficient mass of glass for retention of heat, the glass shelves must be so formed as to produce a considerable volume of glass within the shelf. The glass ordinarily in time loses heat by radiation from its surface and the surfaces of the walls of the bay which produces glass of different viscosities in the shelf which results in the production of glass articles having different characteristics in different parts of each article, that is, seeds and grain appear in the glass articles which causes an objectional appearance of the glass and produces strains that causes ready fracture of the glass.

In order to reduce the radiation of the heat from the glass in the shelf, I have provided a floatable member having a glass delivering port that completely covers the glass within the shelf. The float rides on the surface of the glass and thus seals the inner surfaces of the sides of the shelf and prevents direct radiation from the surface of the glass except from that portion into which the molds 12 dip. Preferably, the inner edge of the float protrudes within the outer surface of the wall 7 and within the opening 6 and so as to quite completely seal the glass of the furnace within the furnace and the shelf from direct radiation except through the port.

As shown in the drawings, the floatable member 15 has dimensions substantially corresponding to the interior horizontal area of the glass delivering shelf and is formed to have a shape that conforms to the shape of the interior of the shelf at its upper edge. The float 15 is formed of a refractory clay and is rendered floatable, preferably by forming the trough 16 having a sufficient depth and width to produce the required lightness proportionate to the displacement of the glass by the member. The trough 16 may be filled with a suitable diatomacious earth or other heat insulating refractory material of light weight in order to produce floatability and maintain the desired heat insulation. Preferably, the outer edges of the floatable insulator is rounded, as indicated at 17, in order to produce substantially a narrow line of contact with the inner edges of the shelf 8. The glass at the line of substantial contact readily chills and seals with a highly viscous relatively cold though molten glass the outer edge portion of the member 15 to the edge of the shelf. This reduces heat radiation and allows for the slight variation of the glass level.

The central portion of the member 15 is provided with an arcuate shaped opening 19 having its center substantially at the center of rotation of the arms and the gathering molds 12. Also, preferably, the sides of the opening 19 are inclined, as at 18. As they extend towards the underside of the member 15, they are inclined away from the imaginary, arcuate, vertically displaced surface that extends lengthwise of the slot. This provides an inverted funnel shaped part for allowing the glass to move from all parts of the shelf towards the upper edge of the port 19 and to the gathering molds 12 as they enter and pass along the port.

As shown in Fig. 2, the molds enter one end of the port or opening 19 and move along the opening and rise near the opposite end of the port and as they rise the glass that adheres is sheared, in the manner well known in the art, the sheared glass falling into the shelf near the end of the port. The floatable member 15 is formed to retain the glass gobs or sheared portions of the glass at the delivery end of the opening 19. The cut-off portions are, however, soon raised in temperature to the glass of the shelf and the glass of the parts sheared from the gathering container soon redistributes itself in the glass of the shelf. Preferably, the member 15 is provided with a bridge 22 having a wedge shaped outer edge 23 so located as to dispose the edge 23 of the wedge portion of the bridge 22 close to and below the level of the glass. This forms a drag to the glass that is drawn from the glass in the shelf by the container and when the glass is sheared from the gathering containers 12, it drops into the glass in the shelf through the port located on the following side of the bridge 22 where it is retained until the heat of the glass within the shelf raises it to a temperature equal to that of the glass in the shelf and thus gives it the same characteristic as to viscosity as that of the glass found in the shelf.

Suitable burners 25 may be provided for heating the glass within that portion of the furnace in the vicinity of the shelf in the manner well known in the art. They operate to maintain the glass of the shelf at a high temperature and supply heat lost by radiation and consequently they aid indirectly in the addition of the necessary heat required to restore the temperature of portions of the sheared glass to that of the body of glass of the furnace and the shelf.

As illustrated in Fig. 3 the gathering mold 12, shown in what might be termed phantom lines, moves progressively over the shelf and dips into the glass reaching its maximum depth of movement at substantially the point indicated at 12'. It then rises, dragging with it the gob of glass 26 which drags over the edge 23 of the bridge 22 located slightly below the surface of the glass and carries it into the port 27 or that portion of the arcuate opening 19 located on the following side of the bridge 22. The shearing knife 28 commonly used for removing the glass that strings from the container begins to shear the gob of glass on the following side of the ridge 22, the shear being made complete and so as to drop the gob of glass in the port 27, that is in the part of the opening 19 on the following side of the bridge 22. Each succeeding gathering mold drops the sheared glass and this glass, though slightly cooled by contact with the atmosphere when raised is reheated by the heat of the body of the glass of the shelf and consequently soon acquires the same viscosity of the glass of the shelf.

As succeeding molds sweep through the oblong opening 19, that has a width substantially the same as that of the gathering mold, a circulatory movement of the glass within the area of the opening and particularly that portion of the glass at the surface of the shelf and within the opening is carried forward and toward the port 27. The mold itself operates to remove some of the heat of the glass within the opening 19 and glass cooled by contact with the mold as well as the surface glass is likewise carried forward towards the delivery end of the opening 19. Consequently the structure is such as to produce a constant movement of hot glass into the opening 19 where it is gathered by the gathering molds and with much greater efficiency than could be produced in wide open area of the shelf if the floatable heat insulator was not present.

In the form of construction illustrated in Figs. 4 and 5, the shelf edge is provided with refractory plates 30 and 31 that are supported on the outer side and edges of the walls of the shelf or bay, and overhanging a short distance the surface of the glass in the shelf so as to make contact, preferably, with the side surfaces of the floatable member 15. This operates to heat seal that portion of the glass located intermediate the side and end walls of the shelf or bay and the member 15.

I claim:

1. In combination with a glass shelf, a refractory member substantially fitting the interior of the shelf and floatable on the surface of the glass in the shelf and having an arcuate glass delivering port, a suction gathering mold, and means for moving the mold circularly along and into the port.

2. In combination with a glass shelf, a refractory member substantially fitting the interior of the shelf and floatable on the surface of the glass in the shelf and having an arcuate glass delivering port, a suction gathering mold having a glass shearing means, and means for moving the mold circularly along and into the port, a bridge part extending across the port near the glass delivering end of the port and forming an auxiliary port for receiving sheared glass.

3. In combination with a glass shelf, a refractory member substantially fitting the interior of the shelf and floatable on the surface of the glass in the shelf and having an arcuate glass delivering port, a suction gathering mold having means for moving the mold circularly along and into the port, the lateral surfaces of the port inclined outwardly from the upper edge of the port to enable a free flow of heated glass from the shelf into the port and heat radiation from the glass body in the shelf to the glass within the port.

4. In combination with a glass shelf, a refractory member substantially fitting the interior of the shelf and floatable on the surface of the glass in the shelf and having an arcuate glass delivering port, a suction gathering mold having a glass shearing means and means for moving the mold circularly along and into the port, a bridge part extending across the port near the glass delivering end of the port and forming a main glass withdrawing port and an auxiliary port for receiving sheared glass, the lateral surfaces of the ports being inclined outwardly from the upper edges of the ports to permit free flow of glass into the main port from the shelf and outward flow of glass from the auxiliary port into the shelf and ready transmission of heat to the glass within the ports.

FRANZ G. SCHWALBE.